United States Patent
An et al.

(10) Patent No.: US 12,549,736 B2
(45) Date of Patent: Feb. 10, 2026

(54) BIDIRECTIONAL INTER PREDICTION METHOD AND TERMINAL BASED ON MOTION VECTOR DIFFERENCE REDUCTION

(71) Applicant: HUAWEI TECHNOLOGIES CO., LTD., Guangdong (CN)

(72) Inventors: Jicheng An, Shenzhen (CN); Xu Chen, Shenzhen (CN); Jianhua Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/914,228

(22) Filed: Oct. 13, 2024

(65) Prior Publication Data
US 2025/0039398 A1 Jan. 30, 2025

Related U.S. Application Data

(63) Continuation of application No. 18/154,961, filed on Jan. 16, 2023, now Pat. No. 12,126,810, which is a
(Continued)

(51) Int. Cl.
*H04N 19/139* (2014.01)
*H04N 19/105* (2014.01)
(Continued)

(52) U.S. Cl.
CPC ......... *H04N 19/139* (2014.11); *H04N 19/105* (2014.11); *H04N 19/176* (2014.11);
(Continued)

(58) Field of Classification Search
CPC .... H04N 19/184; H04N 19/44; H04N 19/533; H04N 19/70; H04N 19/109; H04N 19/157
See application file for complete search history.

(56) References Cited

U.S. PATENT DOCUMENTS

| | | |
|---|---|---|
| 9,077,996 B2 | 7/2015 | Jagannathan et al. |
| 9,736,489 B2 | 8/2017 | Wang et al. |

(Continued)

FOREIGN PATENT DOCUMENTS

| | | |
|---|---|---|
| CN | 101137065 A | 3/2008 |
| CN | 103329537 A | 9/2013 |

(Continued)

OTHER PUBLICATIONS

Hong (C. Hong, H. Hsieh and Y. Lin, "New merge mode decision in High Efficiency Video Coding (HEVC)," 2014 International Computer Science and Engineering Conference (ICSEC), Khon Kaen, 2014, pp. 103-107) (Year: 2014).
(Continued)

*Primary Examiner* — Fabio S Lima

(57) ABSTRACT

An inter prediction method includes obtaining predicted motion information of a current image block, where the predicted motion information is used to obtain one or more motion vectors of the current image block, and the motion vectors include a forward MV and a backward MV for a bidirectional inter prediction. The disclosed method further includes determining a motion vector difference for the current image block, and calculating the motion vectors based on the predicted motion information and the motion vector difference, where the motion vector difference is shared by the forward MV and the backward MV.

18 Claims, 6 Drawing Sheets

Related U.S. Application Data continuation of application No. 17/064,719, filed on Oct. 7, 2020, now Pat. No. 11,558,623, which is a continuation of application No. 16/371,514, filed on Apr. 1, 2019, now Pat. No. 10,841,589, which is a continuation of application No. PCT/CN2016/101081, filed on Sep. 30, 2016.

(51) Int. Cl.
| | |
|---|---|
| *H04N 19/176* | (2014.01) |
| *H04N 19/463* | (2014.01) |
| *H04N 19/513* | (2014.01) |
| *H04N 19/52* | (2014.01) |
| *H04N 19/573* | (2014.01) |
| *H04N 19/577* | (2014.01) |

(52) U.S. Cl.
CPC .......... *H04N 19/463* (2014.11); *H04N 19/52* (2014.11); *H04N 19/521* (2014.11); *H04N 19/573* (2014.11); *H04N 19/577* (2014.11)

(56) References Cited

U.S. PATENT DOCUMENTS

| | | | |
|---|---|---|---|
| 10,841,589 B2 | 11/2020 | An et al. | |
| 2013/0022125 A1 | 1/2013 | Sato | |
| 2013/0070854 A1 | 3/2013 | Wang et al. | |
| 2013/0128983 A1 | 5/2013 | Sugio et al. | |
| 2013/0243093 A1 | 9/2013 | Chen et al. | |
| 2013/0272404 A1 | 10/2013 | Park et al. | |
| 2014/0098882 A1 | 4/2014 | Zhang et al. | |
| 2014/0233654 A1 | 8/2014 | Sato | |
| 2014/0348243 A1 | 11/2014 | Sato | |
| 2015/0201212 A1 | 7/2015 | Zhang et al. | |
| 2017/0085899 A1 | 3/2017 | Oh et al. | |
| 2017/0085909 A1* | 3/2017 | Oh | H04N 19/139 |
| 2017/0118525 A1 | 4/2017 | Song et al. | |
| 2017/0150167 A1 | 5/2017 | Nakamura et al. | |
| 2018/0324454 A1 | 11/2018 | Lin et al. | |
| 2018/0343465 A1* | 11/2018 | Fukushima | H04N 19/182 |
| 2019/0020892 A1 | 1/2019 | Suzuki et al. | |
| 2020/0029091 A1 | 1/2020 | Chien et al. | |

FOREIGN PATENT DOCUMENTS

| | | |
|---|---|---|
| CN | 103797799 A | 5/2014 |
| CN | 103999468 A | 8/2014 |
| CN | 104170381 A | 11/2014 |
| CN | 104602022 A | 5/2015 |
| CN | 105187839 A | 12/2015 |
| JP | 2013102266 A | 5/2013 |
| JP | 2013132046 A | 7/2013 |
| WO | 2012090495 A1 | 7/2012 |
| WO | 2015149698 A1 | 10/2015 |

OTHER PUBLICATIONS

J. Han, Y. Xu and J. Bankoski, "A dynamic motion vector referencing scheme for video coding," 2016 IEEE International Conference on Image Processing (ICIP), Sep. 1, 2016, pp. 2032-2036, doi: 10.1109/ICIP.2016.7532715. (Year: 2016).

Zhou, Minhua et al. A method of decoupling motion data reconstruction from entropy decoding, Joint Collaborative Team on Video Coding (JCTVC) of ITU-T SG16 WP3 and ISO/IEC JTC1/SC29/WG11 6th Meeting: Torino, IT, Jul. 14-22, 2011, JCTVC-F347, Jul. 2, 2011. pp. 1-20.

S. Kudo, M. Kitahara and A. Shimizu, "Motion vector prediction methods considering prediction continuity in HEVC," 2016 Picture Coding Symposium (PCS), 2016, pp. 1-5, doi: 10.1109/PCS.2016.7906336. (Year: 2016).

Ken McCann et al. Samsung s Response to the Call for Proposals on Video ompression Technology, Joint Collaborative Team on Video Coding (JCT-VC) of ITU-T SG16 WP3 and ISO/IEC JTC1/SC29/WG11, JCTVC-A124, 1st Meeting: Dresden, DE, Apr. 15-23, 2010. total 42 pages.

Houjie BI: New-Generation Video Compression Coding Standard-H.264/AVC, Oct. 2004. total 328 pages. With English abstract.

Jianliang Lin et al: "Motion Vector Coding in the HEVC Standard", IEEE Journal of Selected Topics in Signal Processing, vol. 7, No. 6, Dec. 1, 2013, pp. 957-968, XP55238578.

Suzuki Y et al: "Non-CE9: Bi-prediction for low delay coding", ISO/IEC JTC1/SC29/WG11, JCTVC-G305, Nov. 2011, XP30110289. total 5 pages.

Suzuki (NTT Docomo) Y: "CE9:Modification of bi-prediction", ISO/IEC JTC1/SC29/WG11,JCTVC-H0111r1, Feb. 2012, XP30051508. total 13 pages.

Philipp Helle et al. Block Merging for Quadtree-Based Partitioning in HEVC, IEEE Transactions on Circuits and Systems for Video Technology, vol. 22, No. 12, Dec. 2012, pp. 1720-1731.

ITU-T H.265(2015/04), Series H: Audiovisual and Multimedia Systems, Infrastructure of audiovisual services Coding of moving video, High efficiency video coding, Apr. 2015. total 634 pages.

* cited by examiner

BIDIRECTIONAL INTER PREDICTION METHOD AND TERMINAL BASED ON MOTION VECTOR DIFFERENCE REDUCTION

CROSS-REFERENCE TO RELATED APPLICATIONS

This application is a continuation of U.S. patent application Ser. No. 18/154,961, filed on Jan. 16, 2023, which is a continuation of U.S. patent application Ser. No. 17/064,719, filed on Oct. 7, 2020, now U.S. Pat. No. 11,558,623, which is a continuation of U.S. patent application Ser. No. 16/371,514, filed on Apr. 1, 2019, now U.S. Pat. No. 10,841,589, which is a continuation of International Application No. PCT/CN2016/101081, filed on Sep. 30, 2016. All of the afore-mentioned patent applications are hereby incorporated by reference in their entireties.

TECHNICAL FIELD

The present disclosure relates to the field of video encoding and decoding, and in particular, to a video encoding method, a video decoding method, and a terminal.

BACKGROUND

A basic principle of video encoding compression is to use a correlation between space domain, time domain, and a codeword to eliminate redundancy as much as possible. A block-based hybrid video encoding framework is a relatively popular method in which video encoding compression is implemented by performing steps of intra prediction, inter prediction, transformation, quantization, entropy encoding, and the like. Both the Moving Picture Experts Group (MPEG) and High Efficiency Video Coding (HEVC) standards use the block-based hybrid video encoding framework.

During inter prediction, motion information of each image block needs to be determined, so as to generate a prediction block of the image block by using a motion compensation process. The motion information includes reference image information and a motion vector.

When motion information of a current image block is determined, commonly used methods include a merge mode, a non-merge mode, and the like. The following steps may be included in the merge mode. Construct a candidate motion information list, where candidate motion information in the list is obtained through deduction by using motion information of an adjacent block of the current image block in terms of space or time. Select a piece of motion information from the candidate motion information list, transfer an index of the motion information in the list, and specify all motion information of the current image block by using the index of the motion information.

A motion vector in the merge mode is obtained by completely duplicating a motion vector of an adjacent block, and consequently a motion vector of the current image block is insufficiently accurate.

However, in the non-merge mode, the motion information of the current image block may be determined by performing the following steps. Transfer reference image information, where the reference image information includes unidirectional/bidirectional prediction information, one or two reference image lists, and one or two reference image indexes corresponding to the one or two reference image list respectively. Construct a candidate motion vector prediction value list, where a candidate motion vector prediction value in the list is obtained through deduction by using motion information of an adjacent block of the current image block. Select a motion vector prediction value from the candidate motion vector prediction value list, transfer an index of the motion vector prediction value in the list, and specify a motion vector prediction value of the current image block by using the index of the motion vector prediction value. Transfer a motion vector difference, and add the motion vector difference and the motion vector prediction value to obtain a motion vector of the current image block.

In the non-merge mode, the reference image information, the index of the motion vector prediction value, and the corresponding motion vector difference need to be transferred, so that motion information is more accurate. However, a relatively large amount of information is transferred, and consequently a bit rate is relatively high.

SUMMARY

Embodiments of the present disclosure provide a video encoding method, a video decoding method, and a terminal, to reduce information that needs to be transferred in a case of same video quality, thereby saving specific transmission bits.

A first aspect of the embodiments of the present disclosure discloses a video decoding method, including obtaining, from a bitstream, an index of predicted motion information of a current image block in a candidate predicted motion information list, where the predicted motion information includes reference image information and a motion vector prediction value, and candidate predicted motion information in the candidate predicted motion information list is motion information of an adjacent block of the current image block in time domain or space domain, querying the candidate predicted motion information list based on the index, and using the found candidate predicted motion information as the predicted motion information, determining a correspondence between a motion vector difference and a motion vector prediction value based on the predicted motion information, and obtaining the motion vector difference from the bitstream, and adding the motion vector prediction value and the corresponding motion vector difference based on the correspondence to obtain a motion vector of the current image block.

In this implementation, the motion vector prediction value of the current image block is corrected by using the motion vector difference, so that the motion vector of the current image block obtained through reconstruction is more accurate. In addition, the motion vector difference is more effectively determined based on the correspondence between the motion vector difference and the motion vector prediction value, thereby saving transmission bits.

In an optional implementation, the determining a correspondence between a motion vector difference and a motion vector prediction value based on the predicted motion information includes determining a prediction mode of the current image block based on the reference image information, where the prediction mode includes unidirectional prediction or bidirectional prediction, determining a quantity of motion vector differences based on the prediction mode, and determining the correspondence between the motion vector difference and the motion vector prediction value based on the quantity of motion vector differences and the predicted motion information.

In this implementation, the correspondence between the motion vector difference and the motion vector prediction value is determined, and then the motion vector prediction value is corrected by using the motion vector difference corresponding to the motion vector prediction value, so that the motion vector of the current image block obtained through reconstruction is more accurate.

In an optional implementation, the determining a quantity of motion vector differences based on the prediction mode includes if the prediction mode is the unidirectional prediction, determining that there is one motion vector difference, or if the prediction mode is the bidirectional prediction, and the reference image information includes a picture order count of a reference image, determining the quantity of motion vector differences based on the picture order count of the reference image of the current image block, or if the prediction mode is the bidirectional prediction, obtaining the quantity of motion vector differences from at least one of a bitstream of the current image block, and slice-layer header information, image-layer header information, and sequence-layer header information that are of the bitstream.

Beneficial effects of this implementation are as follows. The motion vector prediction value of the current image block is corrected by using the motion vector difference, so that the motion vector of the current image block obtained through reconstruction is more accurate.

In an optional implementation, the determining the quantity of motion vector differences based on the picture order count of the reference image of the current image block includes if a picture order count of a first reference image of the current image block is greater than a picture order count of the current image block, and a picture order count of a second reference image of the current image block is less than the picture order count of the current image block, determining that there are two motion vector differences, or if a picture order count of each reference image of the current image block is greater than a picture order count of the current image block, or a picture order count of each reference image of the current image block is less than a picture order count of the current image block, determining that there is one motion vector difference.

Beneficial effects of this implementation are as follows. The motion vector prediction value of the current image block is corrected by using the motion vector difference, so that the motion vector of the current image block obtained through reconstruction is more accurate.

In an optional implementation, if the prediction mode is the bidirectional prediction, the predicted motion information includes two motion vector prediction values, a first motion vector prediction value and a second motion vector prediction value, and the determining the correspondence between the motion vector difference and the motion vector prediction value based on the quantity of motion vector differences and the predicted motion information includes, if there are two motion vector differences, separately using the two motion vector differences as motion vector differences corresponding to the first motion vector prediction value and the second motion vector prediction value, or if there is one motion vector difference, using the motion vector difference as a motion vector difference corresponding to the first motion vector prediction value, and setting a motion vector difference corresponding to the second motion vector prediction value to 0, or using the motion vector difference as a motion vector difference corresponding to the second motion vector prediction value, and setting a motion vector difference corresponding to the first motion vector prediction value to 0, or using the motion vector difference as a motion vector difference corresponding to each of the first motion vector prediction value and the second motion vector prediction value, or obtaining, from the bitstream, information indicating the motion vector difference corresponds to the first motion vector prediction value or indicating the motion vector difference corresponds to the second motion vector prediction value, and determining a correspondence between the motion vector difference and the motion vector prediction value based on the obtained information.

Beneficial effects of this implementation are as follows. The motion vector prediction value of the current image block is corrected by using the motion vector difference, so that the motion vector of the current image block obtained through reconstruction is more accurate. In addition, the motion vector difference is more effectively determined based on the correspondence between the motion vector difference and the motion vector prediction value, thereby saving transmission bits.

In an optional implementation, a quantity of pieces of candidate predicted motion information in the candidate predicted motion information list is obtained from at least one of the slice-layer header information, the image-layer header information, and the sequence-layer header information that are of the bitstream.

Beneficial effects of this implementation are as follows. The motion vector prediction value of the current image block is corrected by using the motion vector difference, so that the motion vector of the current image block obtained through reconstruction is more accurate.

In an optional implementation, the quantity of pieces of candidate predicted motion information in the candidate predicted motion information list is less than a quantity of pieces of motion information in a motion information list in a merge mode.

Beneficial effects of this implementation are as follows. The quantity of pieces of candidate predicted motion information in the candidate predicted motion information list is controlled to reduce calculation complexity, thereby increasing a decoding speed.

In an optional implementation, the current image block is any prediction unit of a current to-be-reconstructed image block corresponding to the bitstream.

Beneficial effects of this implementation are as follows. The motion vector prediction value of the current image block is corrected by using the motion vector difference, so that the motion vector of the current image block obtained through reconstruction is more accurate. In addition, the motion vector difference is more effectively determined based on the correspondence between the motion vector difference and the motion vector prediction value, thereby saving transmission bits.

A second aspect of the embodiments of the present disclosure discloses a video decoding terminal, and the video decoding terminal includes a processor and a memory. The processor is configured to perform the following operations. Obtaining, from a bitstream, an index of predicted motion information of a current image block in a candidate predicted motion information list, where the predicted motion information includes reference image information and a motion vector prediction value, and candidate predicted motion information in the candidate predicted motion information list is motion information of an adjacent block of the current image block in time domain or space domain, querying the candidate predicted motion information list based on the index, and using the found candidate predicted motion information as the predicted motion information, determining a correspondence between a motion vector difference and a motion vector prediction value based on the predicted motion information, and obtaining the motion vector difference from the bitstream, and adding the motion vector prediction value and the corresponding motion vector difference based on the correspondence to obtain a motion vector of the current image block.

In an optional implementation, that the processor determines a correspondence between a motion vector difference and a motion vector prediction value based on the predicted motion information includes determining a prediction mode of the current image block based on the reference image information, where the prediction mode includes unidirectional prediction or bidirectional prediction, determining a quantity of motion vector differences based on the prediction mode, and determining the correspondence between the motion vector difference and the motion vector prediction value based on the quantity of motion vector differences and the predicted motion information.

In an optional implementation, that the processor determines a quantity of motion vector differences based on the prediction mode includes, if the prediction mode is the unidirectional prediction, determining that there is one motion vector difference, or if the prediction mode is the bidirectional prediction, and the reference image information includes a picture order count of a reference image, determining the quantity of motion vector differences based on the picture order count of the reference image of the current image block, or if the prediction mode is the bidirectional prediction, obtaining the quantity of motion vector differences from at least one of a bitstream of the current image block, and slice-layer header information, image-layer header information, and sequence-layer header information that are of the bitstream.

In an optional implementation, that the processor determines the quantity of motion vector differences based on the picture order count of the reference image of the current image block includes, if a picture order count of a first reference image of the current image block is greater than a picture order count of the current image block, and a picture order count of a second reference image of the current image block is less than the picture order count of the current image block, determining that there are two motion vector differences, or if a picture order count of each reference image of the current image block is greater than a picture order count of the current image block, or a picture order count of each reference image of the current image block is less than a picture order count of the current image block, determining that there is one motion vector difference.

In an optional implementation, if the prediction mode is the bidirectional prediction, the predicted motion information includes two motion vector prediction values, a first motion vector prediction value and a second motion vector prediction value, and that the processor determines the correspondence between the motion vector difference and the motion vector prediction value based on the quantity of motion vector differences and the predicted motion information includes, if there are two motion vector differences, separately using the two motion vector differences as motion vector differences corresponding to the first motion vector prediction value and the second motion vector prediction value, or if there is one motion vector difference, using the motion vector difference as a motion vector difference corresponding to the first motion vector prediction value, and setting a motion vector difference corresponding to the second motion vector prediction value to 0, or using the motion vector difference as a motion vector difference corresponding to the second motion vector prediction value, and setting a motion vector difference corresponding to the first motion vector prediction value to 0, or using the motion vector difference as a motion vector difference corresponding to each of the first motion vector prediction value and the second motion vector prediction value, or obtaining, from the bitstream, information indicating the motion vector difference corresponds to the first motion vector prediction value or indicating the motion vector difference corresponds to the second motion vector prediction value, and determining a correspondence between the motion vector difference and the motion vector prediction value based on the obtained information.

In an optional implementation, a quantity of pieces of candidate predicted motion information in the candidate predicted motion information list is obtained from at least one of the slice-layer header information, the image-layer header information, and the sequence-layer header information that are of the bitstream.

In an optional implementation, the quantity of pieces of candidate predicted motion information in the candidate predicted motion information list is less than a quantity of pieces of motion information in a motion information list in a merge mode.

In an optional implementation, the current image block is any prediction unit of a current to-be-reconstructed image block corresponding to the bitstream.

A third aspect of the embodiments of the present disclosure discloses a video decoding terminal, including a first obtaining unit, configured to obtain, from a bitstream, an index of predicted motion information of a current image block in a candidate predicted motion information list, where the predicted motion information includes reference image information and a motion vector prediction value, and candidate predicted motion information in the candidate predicted motion information list is motion information of an adjacent block of the current image block in time domain or space domain, a query unit, configured to query the candidate predicted motion information list based on the index, and use the found candidate predicted motion information as the predicted motion information, a determining unit, configured to determine a correspondence between a motion vector difference and a motion vector prediction value based on the predicted motion information, a second obtaining unit, configured to obtain the motion vector difference from the bitstream, and an operation unit, configured to add the motion vector prediction value and the corresponding motion vector difference based on the correspondence to obtain a motion vector of the current image block.

In an optional implementation, the determining unit includes a first determining subunit, configured to determine a prediction mode of the current image block based on the reference image information, where the prediction mode includes unidirectional prediction or bidirectional prediction, a second determining subunit, configured to determine a quantity of motion vector differences based on the prediction mode, and a third determining subunit, configured to determine the correspondence between the motion vector difference and the motion vector prediction value based on the quantity of motion vector differences and the predicted motion information.

In an optional implementation, the second determining subunit is configured to if the prediction mode is the unidirectional prediction, determine that there is one motion vector difference, or if the prediction mode is the bidirectional prediction, and the reference image information includes a picture order count of a reference image, determine the quantity of motion vector differences based on the picture order count of the reference image of the current image block, or if the prediction mode is the bidirectional prediction, obtain the quantity of motion vector differences from at least one of slice-layer header information, image-layer header information, and sequence-layer header information that are of the bitstream.

In an optional implementation, when determining the quantity of motion vector differences based on the picture order count of the reference image of the current image block, the second determining subunit is configured to if a picture order count of a first reference image of the current image block is greater than a picture order count of the current image block, and a picture order count of a second reference image of the current image block is less than the picture order count of the current image block, determine that there are two motion vector differences, or if a picture order count of each reference image of the current image block is greater than a picture order count of the current image block, or a picture order count of each reference image of the current image block is less than a picture order count of the current image block, determine that there is one motion vector difference.

In an optional implementation, if the prediction mode is the bidirectional prediction, the predicted motion information includes two motion vector prediction values, a first motion vector prediction value and a second motion vector prediction value, and the third determining subunit is configured to, if there are two motion vector differences, separately use the two motion vector differences as motion vector differences corresponding to the first motion vector prediction value and the second motion vector prediction value, or if there is one motion vector difference, use the motion vector difference as a motion vector difference corresponding to the first motion vector prediction value, and set a motion vector difference corresponding to the second motion vector prediction value to 0, or use the motion vector difference as a motion vector difference corresponding to the second motion vector prediction value, and set a motion vector difference corresponding to the first motion vector prediction value to 0, or use the motion vector difference as a motion vector difference corresponding to each of the first motion vector prediction value and the second motion vector prediction value, or obtain, from the bitstream, information indicating the motion vector difference corresponds to the first motion vector prediction value or indicating the motion vector difference corresponds to the second motion vector prediction value.

In an optional implementation, a quantity of pieces of candidate predicted motion information in the candidate predicted motion information list is obtained from at least one of the slice-layer header information, the image-layer header information, and the sequence-layer header information that are of the bitstream.

In an optional implementation, the quantity of pieces of candidate predicted motion information in the candidate predicted motion information list is less than a quantity of pieces of motion information in a motion information list in a merge mode.

In an optional implementation, the current image block is any prediction unit of a current to-be-reconstructed image block corresponding to the bitstream.

A fourth aspect of the embodiments of the present disclosure discloses a video encoding method, including constructing a candidate predicted motion information list of a current image block, where candidate predicted motion information included in the candidate predicted motion information list is motion information of an adjacent block of the current image block in time domain or space domain, selecting, from the candidate predicted motion information list, a piece of candidate predicted motion information as predicted motion information of the current image block based on a motion vector that is of the current image block and that is obtained during motion estimation, and determining an index of the selected candidate predicted motion information in the candidate predicted motion information list, where the predicted motion information includes reference image information and a motion vector prediction value, determining a correspondence between a motion vector difference and a motion vector prediction value based on the predicted motion information, obtaining, based on the correspondence and the motion vector, a motion vector difference corresponding to the motion vector prediction value, and encoding the index and the motion vector difference into a bitstream.

In an optional implementation, the determining a correspondence between a motion vector difference and a motion vector prediction value based on the predicted motion information includes determining a prediction mode of the current image block based on the reference image information, where the prediction mode includes unidirectional prediction or bidirectional prediction, determining a quantity of motion vector differences based on the prediction mode, and determining the correspondence between the motion vector difference and the motion vector prediction value based on the quantity of motion vector differences and the predicted motion information.

In an optional implementation, the determining a quantity of motion vector differences based on the prediction mode includes, if the prediction mode is the unidirectional prediction, determining that there is one motion vector difference, or if the prediction mode is the bidirectional prediction, and the reference image information includes a picture order count of a reference image of the current image block, determining the quantity of motion vector differences based on the picture order count of the reference image of the current image block, or if the prediction mode is the bidirectional prediction, encoding a preset quantity of motion vector differences into at least one of slice-layer header information, image-layer header information, and sequence-layer header information that are of the bitstream.

In an optional implementation, the determining the quantity of motion vector differences based on the picture order count of the reference image of the current image block includes, if a picture order count of a first reference image of the current image block is greater than a picture order count of the current image block, and a picture order count of a second reference image of the current image block is less than the picture order count of the current image block, determining that there are two motion vector differences, or if a picture order count of each reference image of the current image block is greater than a picture order count of the current image block, or a picture order count of each reference image of the current image block is less than a picture order count of the current image block, determining that there is one motion vector difference.

In an optional implementation, if the prediction mode is the bidirectional prediction, the predicted motion information includes two motion vector prediction values, a first motion vector prediction value and a second motion vector prediction value, and the determining the correspondence between the motion vector difference and the motion vector prediction value based on the quantity of motion vector differences and the predicted motion information includes, if there are two motion vector differences, separately using the two motion vector differences as motion vector differences corresponding to the first motion vector prediction value and the second motion vector prediction value, or if there is one motion vector difference, using the motion vector difference as a motion vector difference corresponding to the first motion vector prediction value, and setting a motion vector difference corresponding to the second motion vector prediction value to 0, or using the motion vector difference as a motion vector difference corresponding to the second motion vector prediction value, and setting a motion vector difference corresponding to the first motion vector prediction value to 0, or using the motion vector difference as a motion vector difference corresponding to each of the first motion vector prediction value and the second motion vector prediction value, or determining, based on a preset correspondence, a correspondence between the motion vector difference and each of the first motion vector prediction value and the second motion vector prediction value, and encoding the preset correspondence into the bitstream.

In an optional implementation, the method includes encoding a quantity of pieces of candidate predicted motion information in the candidate predicted motion information list into at least one of the slice-layer header information, the image-layer header information, and the sequence-layer header information that are of the bitstream.

In an optional implementation, the quantity of pieces of candidate predicted motion information in the candidate predicted motion information list is less than a quantity of pieces of motion information in a motion information list in a merge mode.

In an optional implementation, the current image block is any prediction unit of a current to-be-encoded image block corresponding to the bitstream.

A fifth aspect of the embodiments of the present disclosure discloses a video encoding terminal, and the video encoding terminal includes a processor and a memory. The processor is configured to perform the following operations. Constructing a candidate predicted motion information list of a current image block, where candidate predicted motion information included in the candidate predicted motion information list is motion information of an adjacent block of the current image block in time domain or space domain, selecting, from the candidate predicted motion information list, a piece of candidate predicted motion information as predicted motion information of the current image block based on a motion vector that is of the current image block and that is obtained during motion estimation, and determining an index of the selected candidate predicted motion information in the candidate predicted motion information list, where the predicted motion information includes reference image information and a motion vector prediction value, determining a correspondence between a motion vector difference and a motion vector prediction value based on the predicted motion information, obtaining, based on the correspondence and the motion vector, a motion vector difference corresponding to the motion vector prediction value, and encoding the index and the motion vector difference into a bitstream.

In an optional implementation, that the processor determines a correspondence between a motion vector difference and a motion vector prediction value based on the predicted motion information includes determining a prediction mode of the current image block based on the reference image information, where the prediction mode includes unidirectional prediction or bidirectional prediction, determining a quantity of motion vector differences based on the prediction mode, and determining the correspondence between the motion vector difference and the motion vector prediction value based on the quantity of motion vector differences and the predicted motion information.

In an optional implementation, that the processor determines a quantity of motion vector differences based on the prediction mode includes, if the prediction mode is the unidirectional prediction, determining that there is one motion vector difference, or if the prediction mode is the bidirectional prediction, and the reference image information includes a picture order count of a reference image of the current image block, determining the quantity of motion vector differences based on the picture order count of the reference image of the current image block, or if the prediction mode is the bidirectional prediction, encoding a preset quantity of motion vector differences into at least one of slice-layer header information, image-layer header information, and sequence-layer header information that are of the bitstream.

In an optional implementation, that the processor determines the quantity of motion vector differences based on the picture order count of the reference image of the current image block includes, if a picture order count of a first reference image of the current image block is greater than a picture order count of the current image block, and a picture order count of a second reference image of the current image block is less than the picture order count of the current image block, determining that there are two motion vector differences, or if a picture order count of each reference image of the current image block is greater than a picture order count of the current image block, or a picture order count of each reference image of the current image block is less than a picture order count of the current image block, determining that there is one motion vector difference.

In an optional implementation, if the prediction mode is the bidirectional prediction, the predicted motion information includes two motion vector prediction values, a first motion vector prediction value and a second motion vector prediction value, and that the processor determines the correspondence between the motion vector difference and the motion vector prediction value based on the quantity of motion vector differences and the predicted motion information includes, if there are two motion vector differences, separately using the two motion vector differences as motion vector differences corresponding to the first motion vector prediction value and the second motion vector prediction value, or if there is one motion vector difference, using the motion vector difference as a motion vector difference corresponding to the first motion vector prediction value, and setting a motion vector difference corresponding to the second motion vector prediction value to 0, or using the motion vector difference as a motion vector difference corresponding to the second motion vector prediction value, and setting a motion vector difference corresponding to the first motion vector prediction value to 0, or using the motion vector difference as a motion vector difference corresponding to each of the first motion vector prediction value and the second motion vector prediction value, or determining, based on a preset correspondence, a correspondence between the motion vector difference and each of the first motion vector prediction value and the second motion vector prediction value, and encoding the preset correspondence into the bitstream.

In an optional implementation, the method includes encoding a quantity of pieces of candidate predicted motion information in the candidate predicted motion information list into at least one of the slice-layer header information, the image-layer header information, and the sequence-layer header information that are of the bitstream.

In an optional implementation, the quantity of pieces of candidate predicted motion information in the candidate predicted motion information list is less than a quantity of pieces of motion information in a motion information list in a merge mode.

In an optional implementation, the current image block is any prediction unit of a current to-be-encoded image block corresponding to the bitstream.

A sixth aspect of the embodiments of the present disclosure discloses a video encoding terminal, including a list construction unit, configured to construct a candidate predicted motion information list of a current image block, where candidate predicted motion information included in the candidate predicted motion information list is motion information of an adjacent block of the current image block in time domain or space domain, a selection unit, configured to select, from the candidate predicted motion information list, a piece of candidate predicted motion information as predicted motion information of the current image block based on a motion vector that is of the current image block and that is obtained during motion estimation, where the predicted motion information includes reference image information and a motion vector prediction value, a first determining unit, configured to determine an index of the selected candidate predicted motion information in the candidate predicted motion information list, a second determining unit, configured to determine a correspondence between a motion vector difference and a motion vector prediction value based on the predicted motion information, an obtaining unit, configured to obtain, based on the correspondence and the motion vector, a motion vector difference corresponding to the motion vector prediction value, and a first encoding unit, configured to encode the index and the motion vector difference into a bitstream.

In an optional implementation, the second determining unit includes a first determining subunit, configured to determine a prediction mode of the current image block based on the reference image information, where the prediction mode includes unidirectional prediction or bidirectional prediction, a second determining subunit, configured to determine a quantity of motion vector differences based on the prediction mode, and a third determining subunit, configured to determine the correspondence between the motion vector difference and the motion vector prediction value based on the quantity of motion vector differences and the predicted motion information.

In an optional implementation, the second determining subunit is configured to if the prediction mode is the unidirectional prediction, determine that there is one motion vector difference, or if the prediction mode is the bidirectional prediction, and the reference image information includes a picture order count of a reference image of the current image block, determine the quantity of motion vector differences based on the picture order count of the reference image of the current image block, or if the prediction mode is the bidirectional prediction, encode a preset quantity of motion vector differences into at least one of slice-layer header information, image-layer header information, and sequence-layer header information that are of the bitstream.

In an optional implementation, when determining the quantity of motion vector differences based on the picture order count of the reference image of the current image block, the second determining subunit is configured to if a picture order count of a first reference image of the current image block is greater than a picture order count of the current image block, and a picture order count of a second reference image of the current image block is less than the picture order count of the current image block, determine that there are two motion vector differences, or if a picture order count of each reference image of the current image block is greater than a picture order count of the current image block, or a picture order count of each reference image of the current image block is less than a picture order count of the current image block, determine that there is one motion vector difference.

In an optional implementation, if the prediction mode is the bidirectional prediction, the predicted motion information includes two motion vector prediction values, a first motion vector prediction value and a second motion vector prediction value, and the third determining subunit is configured to, if there are two motion vector differences, separately use the two motion vector differences as motion vector differences corresponding to the first motion vector prediction value and the second motion vector prediction value, or if there is one motion vector difference, use the motion vector difference as a motion vector difference corresponding to the first motion vector prediction value, and set a motion vector difference corresponding to the second motion vector prediction value to 0, or use the motion vector difference as a motion vector difference corresponding to the second motion vector prediction value, and set a motion vector difference corresponding to the first motion vector prediction value to 0, or use the motion vector difference as a motion vector difference corresponding to each of the first motion vector prediction value and the second motion vector prediction value, or determine, based on a preset correspondence, a correspondence between the motion vector difference and each of the first motion vector prediction value and the second motion vector prediction value, and encode the preset correspondence into the bitstream.

In an optional implementation, the terminal further includes a second encoding unit, configured to encode a quantity of pieces of candidate predicted motion information in the candidate predicted motion information list into at least one of the slice-layer header information, the image-layer header information, and the sequence-layer header information that are of the bitstream.

In an optional implementation, the quantity of pieces of candidate predicted motion information in the candidate predicted motion information list is less than a quantity of pieces of motion information in a motion information list in a merge mode.

In an optional implementation, the current image block is any prediction unit of a current to-be-encoded image block corresponding to the bitstream.

A seventh aspect of the embodiments of the present disclosure discloses a computer storage medium, configured to store computer software instructions used in the first aspect and the fourth aspect, where the computer software instruction includes a program designed for executing the foregoing aspects.

It should be understood that technical solutions in the second aspect to the seventh aspect of the embodiments of the present disclosure are consistent with the technical solutions in the first aspect of the embodiments of the present disclosure, and obtained beneficial effects are similar. Details are not described herein again.

It can be learned from the foregoing technical solutions that the embodiments of the present disclosure have the following advantages. In the embodiments of the present disclosure, reference image information of an adjacent block is obtained and is used as the reference image information of the current image block. For a motion vector, a motion vector of an adjacent block is used to predict the motion vector of the current image block, and the motion vector difference is transferred to correct the motion vector prediction value, to achieve relatively high accuracy of the motion vector. In addition, the motion vector difference is more effectively determined based on the correspondence between the motion vector difference and the motion vector prediction value, thereby saving transmission bits. It can be learned that implementing the embodiments of the present disclosure can reduce information that needs to be transferred in a case of same video quality, thereby saving specific transmission bits.

BRIEF DESCRIPTION OF DRAWINGS

To describe the technical solutions in the embodiments of the present disclosure more clearly, the following briefly describes the accompanying drawings needed for describing the embodiments. Apparently, the accompanying drawings in the following description show merely some embodiments of the present disclosure, and persons of ordinary skill in the art may derive other drawings from these accompanying drawings without creative efforts.

DESCRIPTION OF EMBODIMENTS

To make the objectives, technical solutions, and advantages of the present disclosure clearer, the following further describes the present disclosure in detail with reference to the accompanying drawings. Apparently, the described embodiments are merely some rather than all of the embodiments of the present disclosure. All other embodiments obtained by persons of ordinary skill in the art based on the embodiments of the present disclosure without creative efforts shall fall within the protection scope of the present disclosure.

In the specification, claims, and accompanying drawings of the present disclosure, the terms "first", "second", and the like are intended to distinguish between different objects but do not indicate a particular order. In addition, the terms "include" and "have" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, or the device.

The embodiments of the present disclosure provide a video encoding method, a video decoding method, and a terminal, to reduce information that needs to be transferred in a case of same video quality, thereby saving specific transmission bits. Details are separately described below.

Figure 1:
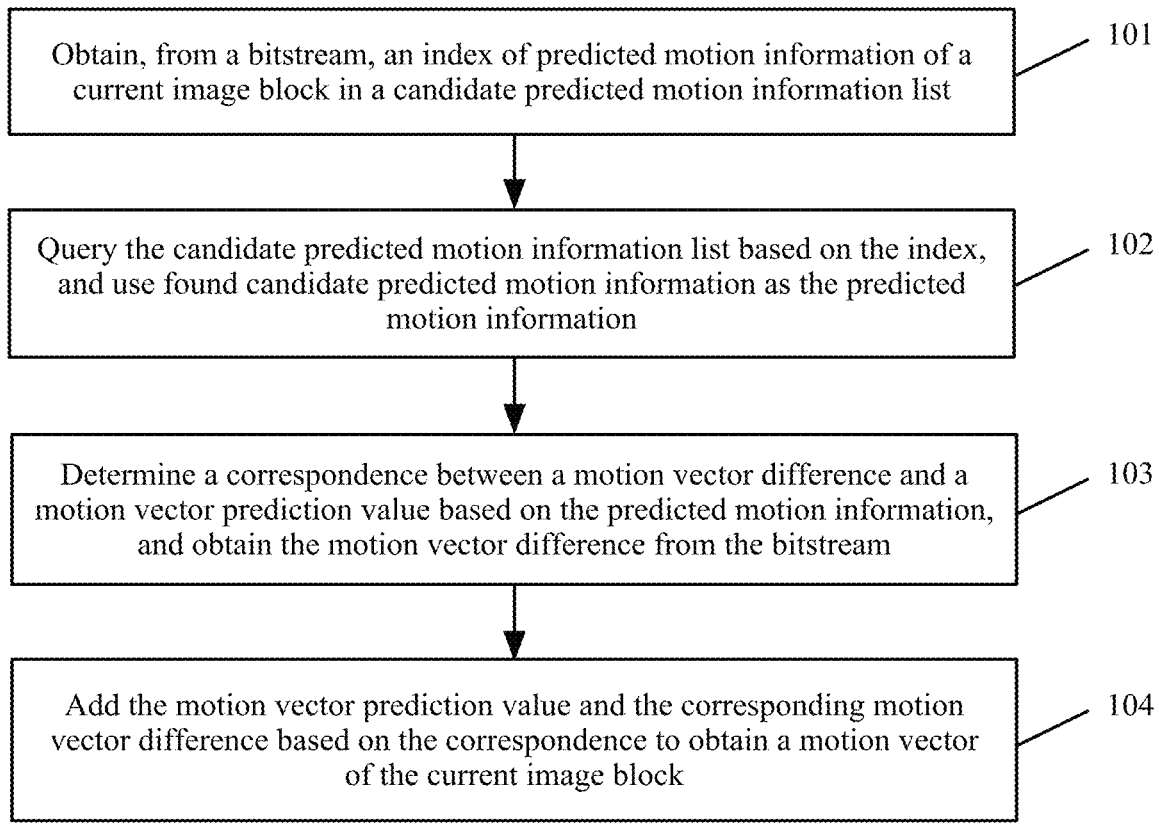
FIG. 1 is a schematic flowchart of a video decoding method disclosed in an embodiment of the present disclosure.

FIG. 1 is a schematic flowchart of a video decoding method disclosed in an embodiment of the present disclosure. The video decoding method shown in FIG. 1 may include the following steps.

Step 101. Obtain, from a bitstream, an index of predicted motion information of a current image block in a candidate predicted motion information list.

In this embodiment of the present disclosure, the predicted motion information includes reference image information and a motion vector prediction value, and candidate predicted motion information in the candidate predicted motion information list is motion information of an adjacent block of the current image block in time domain or space domain.

In this embodiment of the present disclosure, the current image block may be any prediction unit of a current to-be-reconstructed image block corresponding to the bitstream. In some embodiments of the present disclosure, the current image block may alternatively be any transform unit or decoding unit of the current to-be-reconstructed image block corresponding to the bitstream. This is not limited.

A quantity of pieces of candidate predicted motion information in the candidate predicted motion information list may be obtained from at least one of slice-layer header information, image-layer header information, and sequence-layer header information that are of the bitstream.

In addition, the quantity of pieces of candidate predicted motion information in the candidate predicted motion information list is less than a quantity of pieces of motion information in a motion information list in a merge mode. The merge mode is an inter prediction method in the HEVC standard. In the merge mode, a piece of motion information of an adjacent block of the current image block is directly selected from the motion information list to specify motion information of the current image block, and there is a relatively large quantity of pieces of motion information in the motion information list. However, in this embodiment of the present disclosure, the quantity of pieces of candidate predicted motion information in the candidate predicted motion information list is less than the quantity of pieces of motion information in the motion information list in the merge mode, so as to reduce calculation complexity.

Step 102. Query the candidate predicted motion information list based on the index, and use found candidate predicted motion information as the predicted motion information.

Usually, there is a high probability that reference image information of adjacent image blocks is completely the same while motion vectors of the adjacent image blocks are usually slightly different. Therefore, in this embodiment of the present disclosure, the found candidate predicted motion information is used as the predicted motion information, and a motion vector difference is also obtained to correct the motion vector prediction value included in the predicted motion information, to obtain a relatively accurate motion vector of the current image block.

Step 103. Determine a correspondence between a motion vector difference and a motion vector prediction value based on the predicted motion information, and obtain the motion vector difference from the bitstream.

In an optional implementation, the correspondence between the motion vector difference and the motion vector prediction value may be determined based on the predicted motion information in the following manner. Determining a prediction mode of the current image block based on the reference image information, where the prediction mode includes unidirectional prediction or bidirectional prediction, determining a quantity of motion vector differences based on the prediction mode, and determining the correspondence between the motion vector difference and the motion vector prediction value based on the quantity of motion vector differences and the predicted motion information.

In the implementation of determining the correspondence between the motion vector difference and the motion vector prediction value, the step of determining a quantity of motion vector differences based on the prediction mode may be implemented in the following manner. If the prediction mode is the unidirectional prediction, determining that there is one motion vector difference, or if the prediction mode is the bidirectional prediction, and the reference image information includes a picture order count of a reference image, determining the quantity of motion vector differences based on the picture order count of the reference image of the current image block, or if a picture order count of a first reference image of the current image block is greater than a picture order count of the current image block, and a picture order count of a second reference image of the current image block is less than the picture order count of the current image block, determining that there are two motion vector differences, or if a picture order count of each reference image of the current image block is greater than a picture order count of the current image block, or a picture order count of each reference image of the current image block is less than a picture order count of the current image block, determining that there is one motion vector difference, or if the prediction mode is the bidirectional prediction, obtaining the quantity of motion vector differences from at least one of the bitstream of the current image block, and slice-layer header information, image-layer header information, and sequence-layer header information that are of the bitstream.

After the quantity of motion vector differences is obtained, if the prediction mode is the bidirectional prediction, the predicted motion information includes two motion vector prediction values, a first motion vector prediction value and a second motion vector prediction value, the correspondence between the motion vector difference and the motion vector prediction value may be determined in the following manner. If there are two motion vector differences, separately using the two motion vector differences as motion vector differences corresponding to the first motion vector prediction value and the second motion vector prediction value, or if there is one motion vector difference, using the motion vector difference as a motion vector difference corresponding to the first motion vector prediction value, and setting a motion vector difference corresponding to the second motion vector prediction value to 0, or using the motion vector difference as a motion vector difference corresponding to the second motion vector prediction value, and setting a motion vector difference corresponding to the first motion vector prediction value to 0, or using the motion vector difference as a motion vector difference corresponding to each of the first motion vector prediction value and the second motion vector prediction value, or obtaining, from the bitstream, information indicating the motion vector difference corresponds to the first motion vector prediction value or indicating the motion vector difference corresponds to the second motion vector prediction value, and determining a correspondence between the motion vector difference and the motion vector prediction value based on the obtained information.

It should be noted that in a feasible implementation, the motion vector difference is used as the motion vector difference corresponding to each of the first motion vector prediction value and the second motion vector prediction value. In other words, the motion vector difference is reused. This saves consumption for encoding the motion vector difference and improves efficiency.

Step 104. Add the motion vector prediction value and the corresponding motion vector difference based on the correspondence to obtain a motion vector of the current image block.

In this embodiment of the present disclosure, the motion vector prediction value and the corresponding motion vector difference are added, so that an offset of the motion vector prediction value can be corrected, and the motion vector of the current image block can be relatively accurately restored.

It can be learned that according to the video decoding method described in FIG. 1, the motion vector of the current image block can be relatively accurately restored, and therefore an output video has relatively high quality in a case of a same bit rate.

Figure 2:
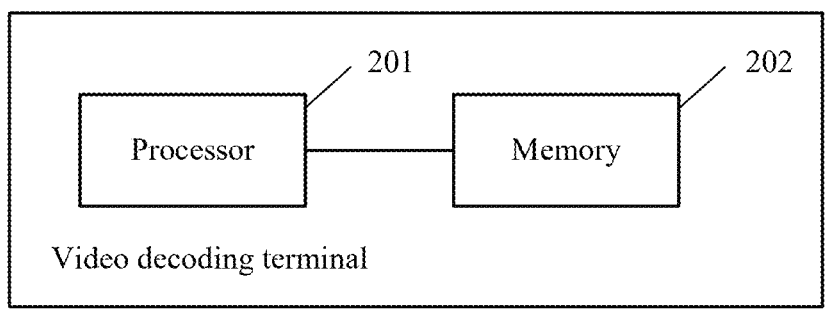
FIG. 2 is a schematic structural diagram of a video decoding terminal disclosed in an embodiment of the present disclosure.

FIG. 2 is a schematic structural diagram of a video decoding terminal disclosed in an embodiment of the present disclosure. As shown in FIG. 2, the terminal includes a processor 201 and a memory 202. The memory 202 may be configured to store cache needed by the processor 201 for performing data processing, and may be further configured to provide data invoked by the processor 201 for performing data processing and provide storage space for obtained result data.

In this embodiment of the present disclosure, the processor 201 is configured to perform the following operations by invoking program code stored in the memory 202. Obtaining, from a bitstream, an index of predicted motion information of a current image block in a candidate predicted motion information list, where the predicted motion information includes reference image information and a motion vector prediction value, and candidate predicted motion information in the candidate predicted motion information list is motion information of an adjacent block of the current image block in time domain or space domain, querying the candidate predicted motion information list based on the index, and using the found candidate predicted motion information as the predicted motion information, determining a correspondence between a motion vector difference and a motion vector prediction value based on the predicted motion information, and obtaining the motion vector difference from the bitstream, and adding the motion vector prediction value and the corresponding motion vector difference based on the correspondence to obtain a motion vector of the current image block.

According to the video decoding terminal described in FIG. 2, the motion vector of the current image block can be relatively accurately restored, and therefore an output video has relatively high quality in a case of a same bit rate.

Figure 3:
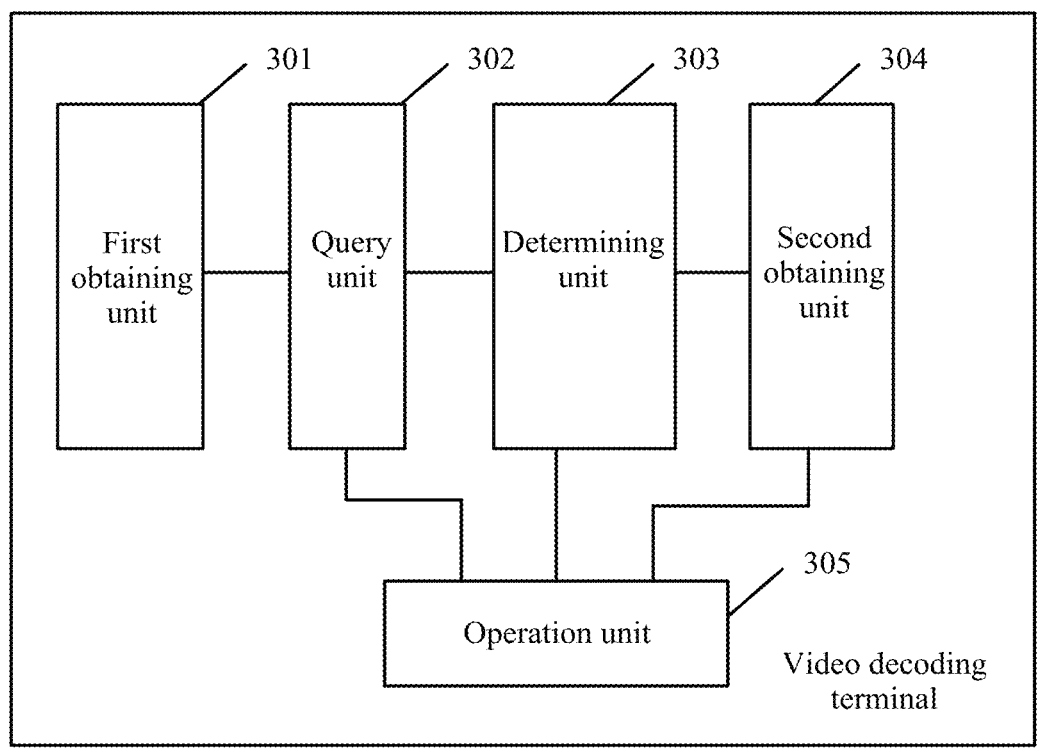
FIG. 3 is a schematic structural diagram of another video decoding terminal disclosed in an embodiment of the present disclosure.

FIG. 3 is a schematic structural diagram of another video decoding terminal disclosed in an embodiment of the present disclosure. As shown in FIG. 3, the terminal may include a first obtaining unit 301, configured to obtain, from a bitstream, an index of predicted motion information of a current image block in a candidate predicted motion information list, where the predicted motion information includes reference image information and a motion vector prediction value, and candidate predicted motion information in the candidate predicted motion information list is motion information of an adjacent block of the current image block in time domain or space domain, a query unit 302, configured to query the candidate predicted motion information list based on the index, and use the found candidate predicted motion information as the predicted motion information, a determining unit 303, configured to determine a correspondence between a motion vector difference and a motion vector prediction value based on the predicted motion information, a second obtaining unit 304, configured to obtain the motion vector difference from the bitstream, and an operation unit 305, configured to add the motion vector prediction value and the corresponding motion vector difference based on the correspondence to obtain a motion vector of the current image block.

According to the video decoding terminal described in FIG. 3, the motion vector of the current image block can be relatively accurately restored, and therefore an output video has relatively high quality in a case of a same bit rate.

Figure 4:
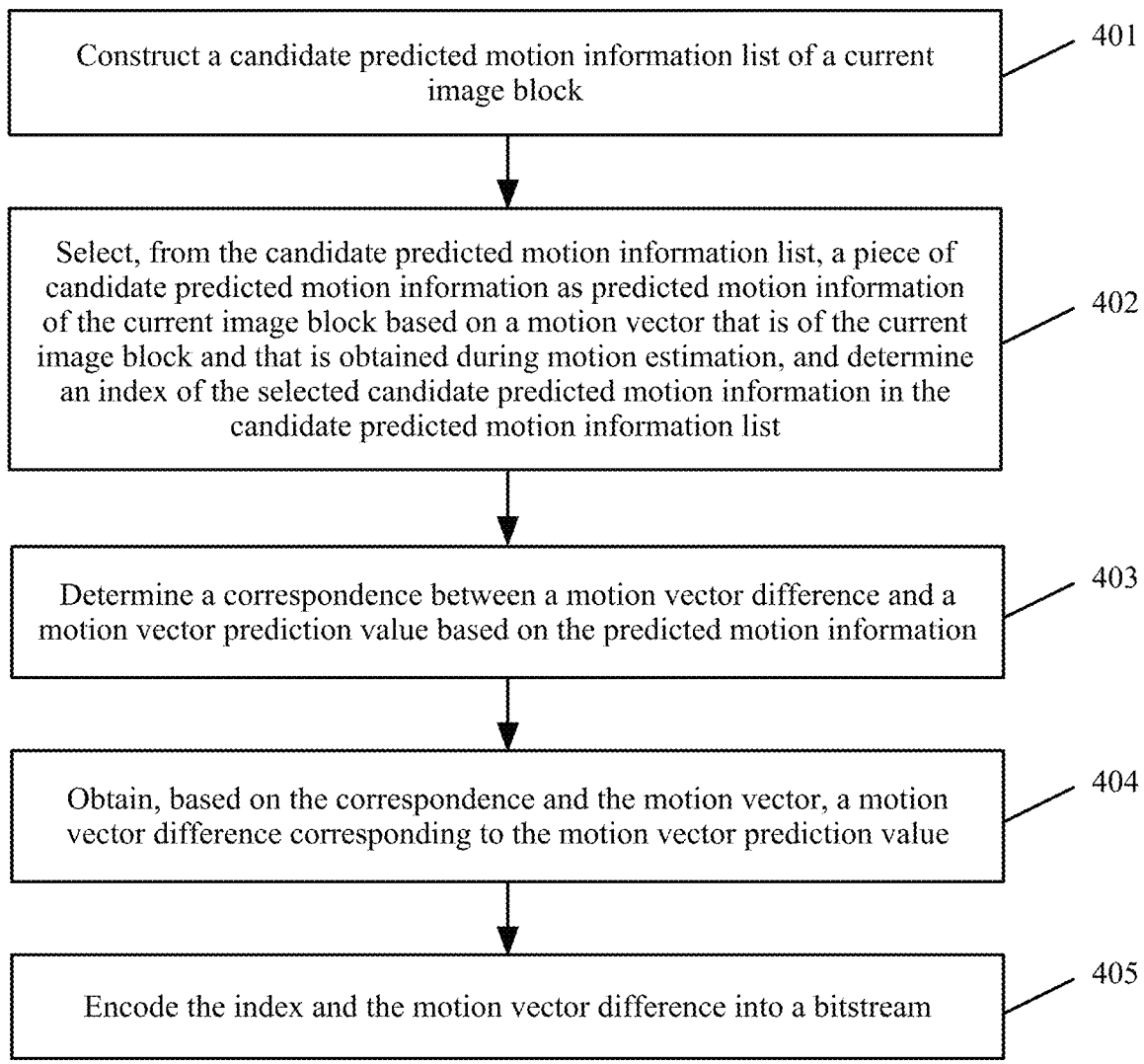
FIG. 4 is a schematic flowchart of a video encoding method disclosed in an embodiment of the present disclosure.

FIG. 4 is a schematic flowchart of a video encoding method disclosed in an embodiment of the present disclosure. The video encoding method shown in FIG. 4 may include the following steps.

Step 401. Construct a candidate predicted motion information list of a current image block, where candidate predicted motion information included in the candidate predicted motion information list is motion information of an adjacent block of the current image block in time domain or space domain.

In this embodiment of the present disclosure, the current image block is any prediction unit of a current to-be-encoded image block corresponding to a bitstream. In some embodiments of the present disclosure, the current image block may alternatively be any transform unit or decoding unit of the current to-be-encoded image block corresponding to the bitstream. This is not limited.

In an optional implementation, a quantity of pieces of candidate predicted motion information in the candidate predicted motion information list may be encoded into at least one of slice-layer header information, image-layer header information, and sequence-layer header information that are of the bitstream.

In addition, the quantity of pieces of candidate predicted motion information in the candidate predicted motion information list is less than a quantity of pieces of motion information in a motion information list in a merge mode. The merge mode is an inter prediction method in the HEVC standard. In the merge mode, a piece of motion information of an adjacent block of the current image block is directly selected from the motion information list to specify motion information of the current image block, and there is a relatively large quantity of pieces of motion information in the motion information list. However, in this embodiment of the present disclosure, the quantity of pieces of candidate predicted motion information in the candidate predicted motion information list is less than the quantity of pieces of motion information in the motion information list in the merge mode, so as to reduce calculation complexity.

Step 402. Select, from the candidate predicted motion information list, a piece of candidate predicted motion information as predicted motion information of the current image block based on a motion vector that is of the current image block and that is obtained during motion estimation, and determine an index of the selected candidate predicted motion information in the candidate predicted motion information list, where the predicted motion information includes reference image information and a motion vector prediction value.

In this embodiment of the present disclosure, motion estimation is performed on the current image block by using motion information of an adjacent block. In an optional implementation, locations of a plurality of motion vectors are obtained during motion estimation, and a motion vector having minimum rate-distortion costs is selected as the motion vector of the current image block.

In a feasible implementation, the candidate predicted motion information in the candidate predicted motion information list is traversed, and each piece of candidate predicted motion information is used as the predicted motion information of the current image block to calculate rate-distortion costs, so as to select a piece of candidate predicted motion information having minimum rate-distortion costs as the predicted motion information of the current image block.

Step 403. Determine a correspondence between a motion vector difference and a motion vector prediction value based on the predicted motion information.

In this embodiment of the present disclosure, the correspondence between the motion vector difference and the motion vector prediction value may be determined in the following manner. Determining a prediction mode of the current image block based on the reference image information, where the prediction mode includes unidirectional prediction or bidirectional prediction, determining a quantity of motion vector differences based on the prediction mode, and determining the correspondence between the motion vector difference and the motion vector prediction value based on the quantity of motion vector differences and the predicted motion information.

The determining a quantity of motion vector differences based on the prediction mode may be implemented in the following manner. If the prediction mode is the unidirectional prediction, determining that there is one motion vector difference, or if the prediction mode is the bidirectional prediction, and the reference image information includes a picture order count of a reference image of the current image block, determining the quantity of motion vector differences based on the picture order count of the reference image of the current image block, or if a picture order count of a first reference image of the current image block is greater than a picture order count of the current image block, and a picture order count of a second reference image of the current image block is less than the picture order count of the current image block, determining that there are two motion vector differences, or if a picture order count of each reference image of the current image block is greater than a picture order count of the current image block, or a picture order count of each reference image of the current image block is less than a picture order count of the current image block, determining that there is one motion vector difference, or if the prediction mode is the bidirectional prediction, encoding a preset quantity of motion vector differences into at least one of the bitstream of the current image block, and slice-layer header information, image-layer header information, and sequence-layer header information that are of the bitstream.

After the quantity of motion vector differences is determined, the correspondence between the motion vector difference and the motion vector prediction value may be determined in the following manner. If there are two motion vector differences, separately using the two motion vector differences as motion vector differences corresponding to the first motion vector prediction value and the second motion vector prediction value, or if there is one motion vector difference, using the motion vector difference as a motion vector difference corresponding to the first motion vector prediction value, and setting a motion vector difference corresponding to the second motion vector prediction value to 0, or using the motion vector difference as a motion vector difference corresponding to the second motion vector prediction value, and setting a motion vector difference corresponding to the first motion vector prediction value to 0, or using the motion vector difference as a motion vector difference corresponding to each of the first motion vector prediction value and the second motion vector prediction value, or determining, based on a preset correspondence, a correspondence between the motion vector difference and each of the first motion vector prediction value and the second motion vector prediction value, and encoding the preset correspondence into the bitstream.

It should be noted that in a feasible implementation, the motion vector difference is used as the motion vector difference corresponding to each of the first motion vector prediction value and the second motion vector prediction value. In other words, the motion vector difference is reused. This saves consumption for encoding the motion vector difference and improves efficiency.

Step 404. Obtain, based on the correspondence and the motion vector, a motion vector difference corresponding to the motion vector prediction value.

The motion vector of the current image block is determined in step 402, and therefore the motion vector difference corresponding to the motion vector prediction value can be obtained by subtracting the motion vector prediction value from the motion vector of the current image block.

Step 405. Encode the index and the motion vector difference into a bitstream.

It can be learned that according to the video encoding method described in FIG. 4, only the index and the motion vector difference need to be transmitted in the bitstream, and the motion information of the current image block can be restored at a decoding end. Therefore, a specific bit rate can be saved by using the method in a case of same video quality.

Figure 5:
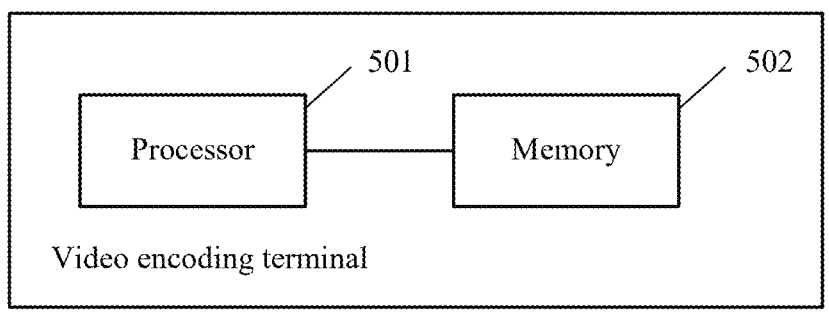
FIG. 5 is a schematic structural diagram of a video encoding terminal disclosed in an embodiment of the present disclosure.

FIG. 5 is a schematic structural diagram of a video encoding terminal disclosed in an embodiment of the present disclosure. As shown in FIG. 5, the terminal includes a processor 501 and a memory 502. The memory 502 may be configured to store cache needed by the processor 501 for performing data processing, and may be further configured to provide data invoked by the processor 501 for performing data processing and provide storage space for obtained result data.

In this embodiment of the present disclosure, the processor 501 is configured to perform the following operations by invoking program code stored in the memory 502. Constructing a candidate predicted motion information list of a current image block, where candidate predicted motion information included in the candidate predicted motion information list is motion information of an adjacent block of the current image block in time domain or space domain, selecting, from the candidate predicted motion information list, a piece of candidate predicted motion information as predicted motion information of the current image block based on a motion vector that is of the current image block and that is obtained during motion estimation, and determining an index of the selected candidate predicted motion information in the candidate predicted motion information list, where the predicted motion information includes reference image information and a motion vector prediction value, determining a correspondence between a motion vector difference and a motion vector prediction value based on the predicted motion information, obtaining, based on the correspondence and the motion vector, a motion vector difference corresponding to the motion vector prediction value, and encoding the index and the motion vector difference into a bitstream.

It can be learned that according to the video encoding terminal described in FIG. 5, only the index and the motion vector difference need to be transmitted in the bitstream, and motion information of the current image block can be restored at a decoding end. Therefore, a specific bit rate can be saved by using the terminal in a case of same video quality.

Figure 6:
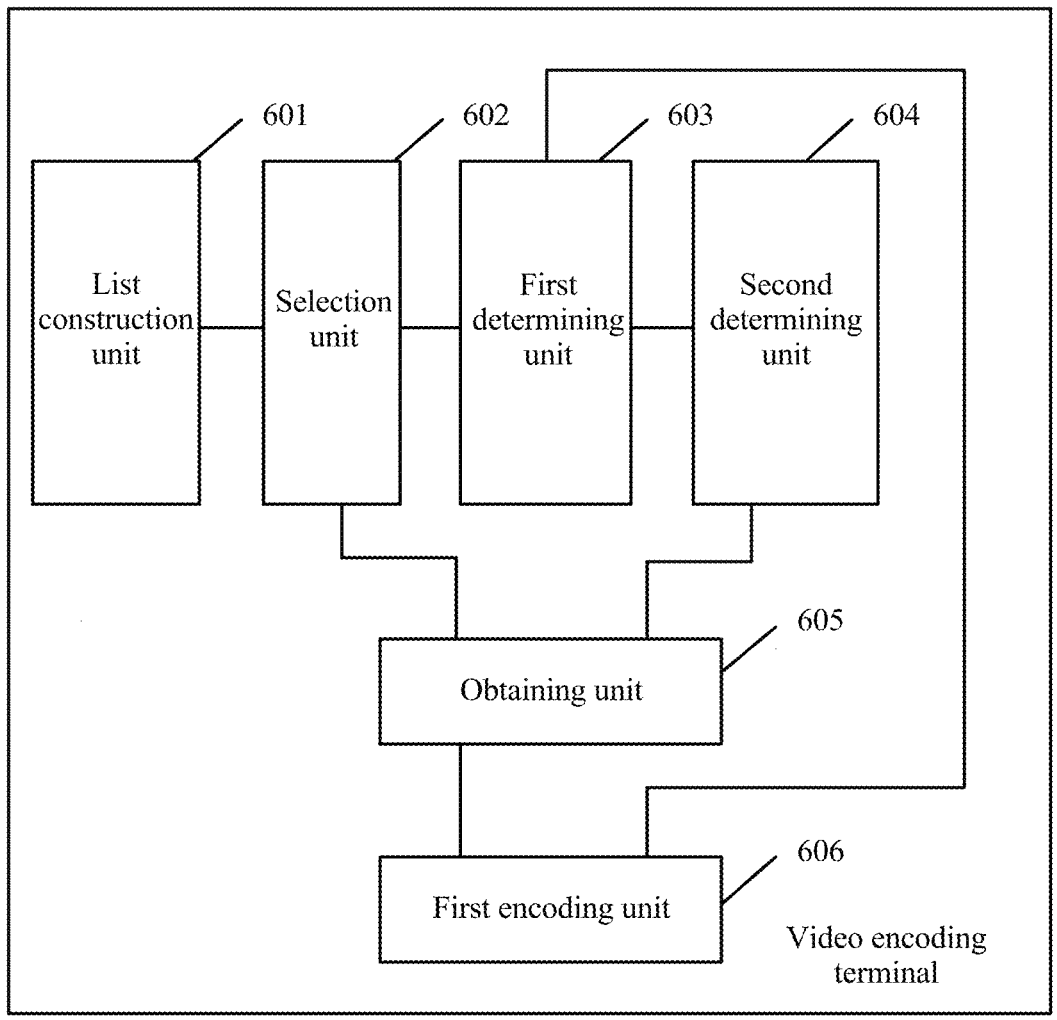
FIG. 6 is a schematic structural diagram of another video encoding terminal disclosed in an embodiment of the present disclosure.

FIG. 6 is a schematic structural diagram of another video encoding terminal disclosed in an embodiment of the present disclosure. As shown in FIG. 6, the terminal may include a list construction unit 601, configured to construct a candidate predicted motion information list of a current image block, where candidate predicted motion information included in the candidate predicted motion information list is motion information of an adjacent block of the current image block in time domain or space domain, a selection unit 602, configured to select, from the candidate predicted motion information list, a piece of candidate predicted motion information as predicted motion information of the current image block based on a motion vector that is of the current image block and that is obtained during motion estimation, where the predicted motion information includes reference image information and a motion vector prediction value, a first determining unit 603, configured to determine an index of the selected candidate predicted motion information in the candidate predicted motion information list, a second determining unit 604, configured to determine a correspondence between a motion vector difference and a motion vector prediction value based on the predicted motion information, an obtaining unit 605, configured to obtain, based on the correspondence and the motion vector, a motion vector difference corresponding to the motion vector prediction value, and a first encoding unit 606, configured to encode the index and the motion vector difference into a bitstream.

It can be learned that according to the video encoding terminal described in FIG. 6, only the index and the motion vector difference need to be transmitted in the bitstream, and motion information of the current image block can be restored at a decoding end. Therefore, a specific bit rate can be saved by using the terminal in a case of same video quality.

Figure 7:
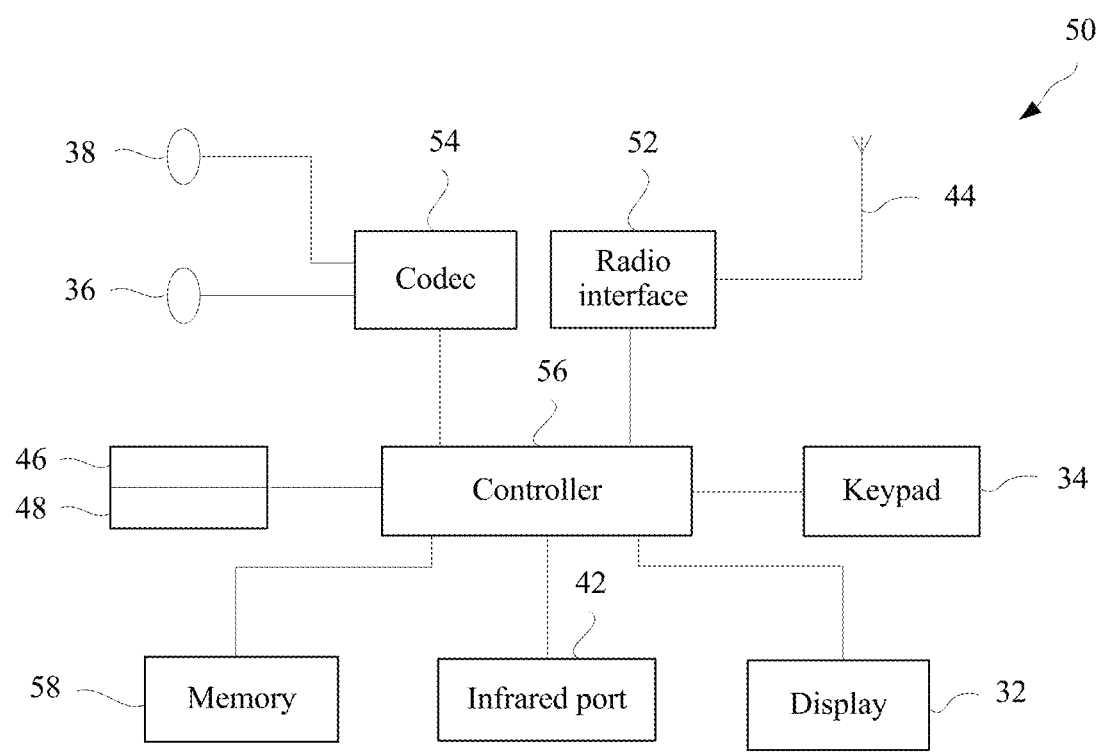
FIG. 7 is a schematic structural diagram of a video encoding/decoding apparatus or an electronic device disclosed in an embodiment of the present disclosure.

FIG. 7 is a schematic structural diagram of a video encoding/decoding apparatus or an electronic device 50 disclosed in an embodiment of the present disclosure. The apparatus or the electronic device may be incorporated into a codec in the embodiments of the present disclosure. Details are described below.

The electronic device 50 may be, for example, a mobile terminal or user equipment in a wireless communications system. It should be understood that the embodiments of the present disclosure can be implemented on any electronic device or apparatus that may need to encode and decode, or encode, or decode a video image.

The electronic device 50 may include a housing 30 that is used to protect the apparatus and that is incorporated into the device. The apparatus 50 may further include a display 32 in a form of a liquid crystal display. In other embodiments of the present disclosure, the display may be any appropriate display suitable for displaying an image or a video. The apparatus 50 may further include a keypad 34. In other embodiments of the present disclosure, any appropriate data or user interface mechanism may be used. For example, a user interface may be implemented as a virtual keyboard or a data entry system may be implemented as a part of a touch-sensitive display. The apparatus may include a microphone 36 or any appropriate audio input, and the audio input may be digital or analog signal input. The apparatus 50 may further include the following audio output device. The audio output device in this embodiment of the present disclosure may be any of an earphone 38, a speaker, an analog audio output connection, or a digital audio output connection. The apparatus 50 may also include a battery 40. In other embodiments of the present disclosure, the device may be powered by any appropriate mobile energy device such as a solar cell, a fuel cell, or a clock generator. The apparatus may further include an infrared port 42 used for short-range line-of-sight communication with another device. In other embodiments, the apparatus 50 may further include any appropriate short-range communication solution such as a Bluetooth wireless connection or a USB wired connection.

The apparatus 50 may include a controller 56 or a processor that is configured to control the apparatus 50. The controller 56 may be connected to a memory 58. The memory in this embodiment of the present disclosure may store image data or audio data, and/or store an instruction implemented on the controller 56. The controller 56 may be further connected to a codec circuit 54 that is suitable for implementing audio and/or video data encoding and decoding, or for auxiliary encoding and decoding that are implemented by the controller 56.

The apparatus 50 may further include a smartcard 46 a card reader 48, such as a UICC and a UICC reader, that are configured to provide user information and that are suitable for providing authentication information used for network authentication and user authorization.

The apparatus 50 may further include a radio interface circuit 52. The radio interface circuit is connected to the controller and is suitable for generating, for example, a wireless communication signal used for communication with a cellular communications network, a wireless communications system, or a wireless local area network. The apparatus 50 may further include an antenna 44. The antenna is connected to the radio interface circuit 52, and is configured to send, to another apparatus (or a plurality of apparatuses), a radio frequency signal generated in the radio interface circuit 52, and receive a radio frequency signal from the another apparatus (or the plurality of apparatuses).

In some embodiments of the present disclosure, the apparatus 50 includes a camera capable of recording or detecting single frames, and the codec 54 or the controller receives and processes these single frames. In some embodiments of the present disclosure, the apparatus may receive to-be-processed video image data from another device before transmission and/or storage. In some embodiments of the present disclosure, the apparatus 50 may receive an image through a wireless or wired connection to encode/decode the image.

In this embodiment of the present disclosure, the codec 54 may be configured to perform the video decoding method described in FIG. 1 or the video encoding method described in FIG. 4.

Figure 8:
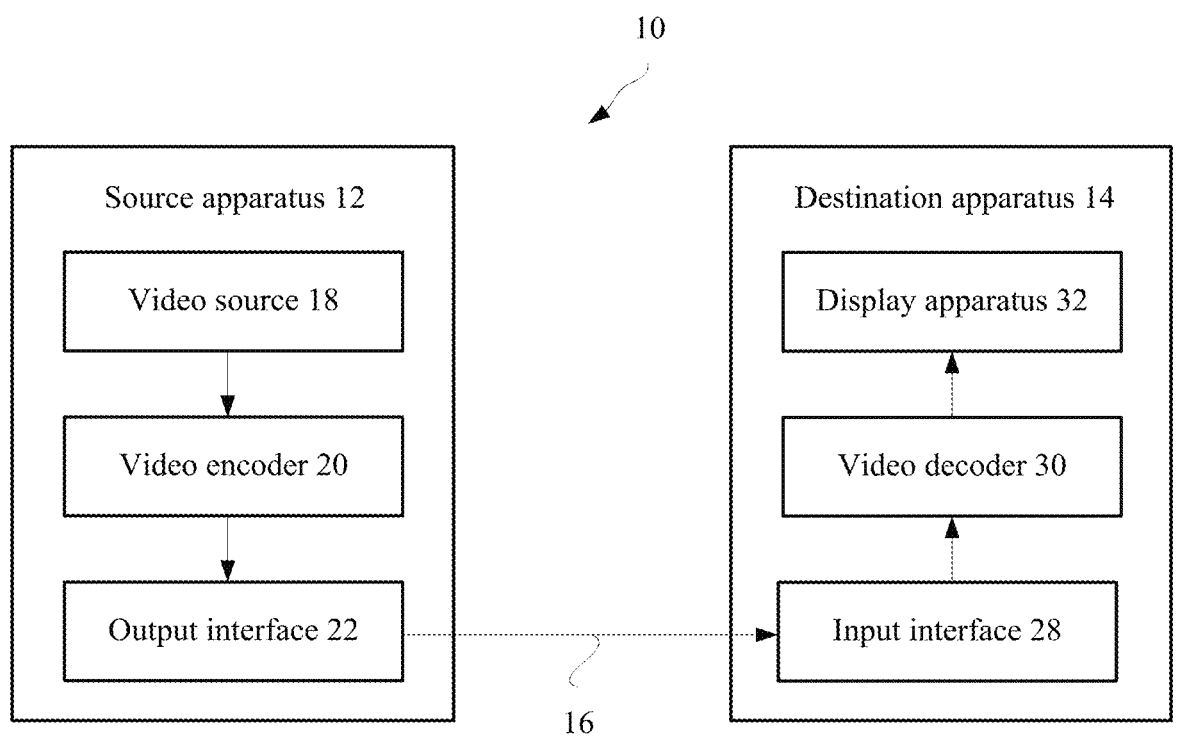
FIG. 8 is a schematic structural diagram of a video encoding/decoding system disclosed in an embodiment of the present disclosure.

FIG. 8 is a schematic structural diagram of a video encoding/decoding system disclosed in an embodiment of the present disclosure. As shown in FIG. 8, the video encoding/decoding system 10 includes a source apparatus 12 and a destination apparatus 14. The source apparatus 12 generates encoded video data. Therefore, the source apparatus 12 may be referred to as a video encoding apparatus or a video encoding device. The destination apparatus 14 may decode the encoded video data generated by the source apparatus 12. Therefore, the destination apparatus 14 may be referred to as a video decoding apparatus or a video decoding device. The source apparatus 12 and the destination apparatus 14 may be instances of a video encoding/decoding apparatus or a video encoding/decoding device. The source apparatus 12 and the destination apparatus 14 may include a wide range of apparatuses, including a desktop computer, a mobile computing apparatus, a notebook (for example, a laptop) computer, a tablet computer, a set top box, a hand-held computer such as a smartphone, a television, a camera, a display apparatus, a digital media player, a video game console, an in-vehicle computer, or the like.

The destination apparatus 14 may receive the encoded video data from the source apparatus 12 through a channel 16. The channel 16 may include one or more media and/or apparatuses capable of moving the encoded video data from the source apparatus 12 to the destination apparatus 14. In an instance, the channel 16 may include one or more communications media that enable the source apparatus 12 to directly transmit the encoded video data to the destination apparatus 14 in real time. In this instance, the source apparatus 12 may modulate the encoded video data according to a communications standard (for example, a wireless communications protocol), and may transmit modulated video data to the destination apparatus 14. The one or more communications media may include wireless and/or wired communications media, for example, a radio frequency (RF) spectrum or one or more physical transmission lines. The one or more communications media may constitute a part of a packet-based network (such as a local area network, a wide area network, or a global network (for example, the Internet)). The one or more communications media may include a router, a switch, a base station, or another device that boosts communication between the source apparatus 12 and the destination apparatus 14.

In another instance, the channel 16 may include a storage medium that stores the encoded video data generated by the source apparatus 12. In this instance, the destination apparatus 14 may access the storage medium through disk access or card access. The storage medium may include a plurality of locally accessible data storage media such as a BLU-RAY, a digital versatile disc (DVD), a compact disc read only memory (CD-ROM), a flash memory, or another appropriate digital storage medium configured to store encoded video data.

In another instance, the channel 16 may include a file server or another intermediate storage apparatus that stores the encoded video data generated by the source apparatus 12. In this instance, the destination apparatus 14 may access, through streaming transmission or downloading, the encoded video data stored on the file server or the another intermediate storage apparatus. The file server may be a type of server capable of storing the encoded video data and transmitting the encoded video data to the destination apparatus 14. The file server in the instance includes a web server (for example, used for a website), a File Transfer Protocol (FTP) server, a network attached storage (NAS) apparatus, and a local disk drive.

The destination apparatus 14 may access the encoded video data through a standard data connection (for example, an Internet connection). Instance types of the data connection include a wireless channel (for example, a Wi-Fi connection) or a wired connection (for example, a DSL or a cable modem) that are suitable for accessing the encoded video data stored on the file server, or a combination thereof. The encoded video data may be transmitted from the file server through streaming transmission, download transmission, or a combination thereof.

The technology of the present disclosure is not limited to a wireless disclosure scenario. For example, the technology may be applied to video encoding and decoding in a plurality of multimedia disclosures that support the following disclosures over-the-air television broadcast, wireless television transmission, satellite television transmission, streaming video transmission (for example, through the Internet), encoding of video data stored in a data storage medium, decoding of video data stored in a data storage medium, or another disclosure. In some instances, the video encoding/decoding system 10 may be configured to support unidirectional or bidirectional video transmission, to support streaming video transmission, video play, video broadcast and/or a video call, and other disclosures.

In the instance of FIG. 8, the source apparatus 12 includes a video source 18, a video encoder 20, and an output interface 22. In some instances, the output interface 22 may include a modulator/demodulator (a modem) and/or a transmitter. The video source 18 may include a video capture apparatus (for example, a video camera), a video archive including previously captured video data, a video input interface configured to receive video data from a video content provider, and/or a computer graphic system configured to generate video data, or a combination of the foregoing video data sources.

The video encoder 20 may encode video data from the video source 18. In some instances, the source apparatus 12 directly transmits the encoded video data to the destination apparatus 14 by using the output interface 22. The encoded video data may alternatively be stored in the storage medium or on the file server, so that the destination apparatus 14 accesses the encoded video data later to decode and/or play the encoded video data.

In the instance of FIG. 8, the destination apparatus 14 includes an input interface 28, a video decoder 30, and a display apparatus 32. In some instances, the input interface 28 includes a receiver and/or a modem. The input interface 28 may receive the encoded video data through the channel 16. The display apparatus 32 may be integrated with the destination apparatus 14 or may be outside the destination apparatus 14. The display apparatus 32 usually displays decoded video data. The display apparatus 32 may include a plurality of types of display apparatuses, such as a liquid crystal display (LCD), a plasma display, an organic light-emitting diode (OLED) display, or another type of display apparatus.

The video encoder 20 and the video decoder 30 may perform operations according to a video compression standard (for example, the High Efficiency Video Coding H.265 standard), and may conform to an HEVC test model (HM). The textual description International Telecommunications Union-Telecommunications Standardization Sector (ITU-T) H.265 (V3) (July 2015) of the H.265 standard is released on Apr. 29, 2015, may be downloaded from http://handle.itu-.int/11.1002/1000/12455, and all content of the document is incorporated by reference in its entirety.

Alternatively, the video encoder 20 and the video decoder 30 may perform operations according to other proprietary or industry standards. The standards include ITU-TH.261, International Organization for Standardization and International Electrotechnical Commission (ISO/IEC) Moving Picture Experts Group (MPEG_-1Visual, ITU-TH.262 or ISO/IECMPEG-2Visual, ITU-TH.263, ISO/IECMPEG-4Visual, and ITU-TH.264 (also referred to as ISO/IEC MPEG-4 AVC) that includes the following extensions Scalable Video Coding/Decoding (SVC) and Multiview Video Coding/Decoding (MVC). It should be understood that the technology of the present disclosure is not limited to any specific encoding/decoding standard or technology.

In addition, FIG. 8 is merely an instance, and the technology of the present disclosure may be applied to a video encoding/decoding disclosure (for example, single-side video encoding or single-side video decoding) that not necessarily includes any data communication between an encoding apparatus and a decoding apparatus. In other instances, data is retrieved from a local memory, and the data is transmitted through streaming by using a network or the data is operated in a similar manner. The encoding apparatus may encode data and store the data in the memory, and/or the decoding apparatus may retrieve data from the memory and decode the data. In many instances, a plurality of apparatuses that do not communicate with each other and that only encode data into the memory, and/or that only retrieve data from the memory and decode the data perform encoding and decoding.

The video encoder 20 and the video decoder 30 each may be implemented as any of a plurality of appropriate circuits, for example, one or more microprocessors, a digital signal processor (DSP), an application-specific circuit (ASIC), a field programmable gate array (FPGA), a discrete logic circuit, hardware, or any combination thereof. If the technology is partially or completely implemented by using software, the apparatus may store an instruction of the software in an appropriate non-transitory computer readable storage medium, and one or more processors may be used to execute an instruction in hardware to execute the technology of the present disclosure. Any one of the foregoing items (including hardware, software, a combination of hardware and software, and the like) may be considered as one or more processors. The video encoder 20 and the video decoder 30 each may be included in one or more encoders or decoders, and each may be integrated as a part of a combined encoder/decoder (codec (CODEC)) of another apparatus.

The present disclosure may generally indicate that the video encoder 20 "signaling" information to another apparatus (for example, the video decoder 30) by using a signal. The expression "signaling" generally may indicate a syntactic element and/or represent transfer of encoded video data. The transfer may occur in real time or approximately in real time. Alternatively, the communication may occur over a time span, for example, may occur when the syntactic element is stored, during encoding, in a computer readable storage medium by using binary data obtained after encoding. The decoding apparatus may retrieve the syntactic element at any time after the syntactic element is stored in the medium.

It should be noted that the apparatus division is merely logical function division, but the present disclosure is not limited to the foregoing division, as long as corresponding functions can be implemented. In addition, specific names of the functional units are merely provided for the purpose of distinguishing the units from one another, but are not intended to limit the protection scope of the present disclosure.

In addition, persons of ordinary skill in the art may understand that all or some of the steps of the method embodiments may be implemented by a program instructing related hardware. The program may be stored in a computer readable storage medium. The storage medium may include a read-only memory, a magnetic disk, an optical disc, or the like.

The foregoing descriptions are merely specific example implementations of the present disclosure, but are not intended to limit the protection scope of the present disclosure. Any variation or replacement readily figured out by persons skilled in the art within the technical scope disclosed in the embodiments of the present disclosure shall fall within the protection scope of the present disclosure. Therefore, the protection scope of the present disclosure shall be subject to the protection scope of the claims.

What is claimed is:

1. A video decoding method implemented by a video decoding terminal, comprising:
    obtaining an index of predicted motion information of a current image block based on a bitstream, wherein a prediction mode of the current image block is a bidirectional prediction;
    querying a candidate predicted motion information list based on the index to obtain candidate predicted motion information, wherein the candidate predicted motion information comprises motion information of an adjacent block of the current image block in a time domain or a space domain, wherein the candidate predicted motion information is used as the predicted motion information comprising reference image information, a first motion vector prediction value and a second motion vector prediction value, and wherein the reference image information comprises a reference image index of a first reference image and a reference image index of a second reference image;
    obtaining a first motion vector difference of the current image block based on the bitstream;
    obtaining a second motion vector difference based on the prediction mode and the first motion vector difference, wherein the second motion vector difference corresponding to the first motion vector prediction value and the second motion vector prediction value; and
    obtaining a first motion vector value and a second motion vector value of the current image block based on the first motion vector prediction value, the second motion vector prediction value and the second motion vector difference, wherein the second motion vector difference is reused for the first motion vector prediction value and the second motion vector prediction value.

2. The method according to claim 1, wherein the obtaining the first motion vector value and the second motion vector value of the current image block based on the first motion vector prediction value, the second motion vector prediction value and the second motion vector difference comprises:
    adding the second motion vector difference to the first motion vector prediction value to obtain the first motion vector value; and
    adding the second motion vector difference to the second motion vector prediction value to obtain the second motion vector value.

3. The method according to claim 1, wherein obtaining the second motion vector difference based on the prediction mode and the first motion vector difference, wherein the second motion vector difference corresponding to the first motion vector prediction value and the second motion vector prediction value further comprises:
    obtaining the second motion vector difference based on the first motion vector difference when a picture order count of each reference image of the current image block is greater than a picture order count of the current image block, or a picture order count of each reference image of the current image block is less than a picture order count of the current image block.

4. The method according to claim 1, wherein
    a number of pieces of candidate in the candidate predicted motion information list is obtained from at least one of the slice-layer header information, the image-layer header information, or the sequence-layer header information that are of the bitstream.

5. The method according to claim 1, wherein
    a number of pieces of candidate in the candidate predicted motion information list is less than a number of pieces in a motion information list in a merge mode.

6. The method according to claim 1, wherein
    the current image block is any prediction unit of a current to-be-reconstructed image block corresponding to the bitstream.

7. A video decoding terminal, comprising:
    one or more processors; and
    a memory coupled to the one or more processors and for storing instructions that, when executed by the one or more processors, cause the one or more processors to:
    obtain an index of predicted motion information of a current image block based on the bitstream, wherein a prediction mode of the current image block is a bidirectional prediction;
    query a candidate predicted motion information list based on the index to obtain candidate predicted motion information, wherein the candidate predicted motion information comprises motion information of an adjacent block of the current image block in a time domain or a space domain, wherein the candidate predicted motion information is used as the predicted motion information comprising reference image information, a first motion vector prediction value and a second motion vector prediction value, and wherein the reference image information comprises a reference image index of a first reference image and a reference image index of a second reference image;
    obtain a first motion vector difference of the current image block based on the bitstream;
    obtain a second motion vector difference based on the prediction mode and the first motion vector difference, wherein the second motion vector difference corresponding to the first motion vector prediction value and the second motion vector prediction value; and
    obtain a first motion vector value and a second motion vector value of the current image block based on the first motion vector prediction value, the second motion vector prediction value and the second motion vector difference, wherein the second motion vector difference is reused for the first motion vector prediction value and the second motion vector prediction value.

8. The video decoding terminal according to claim 7, wherein the instructions, when further executed by the one or more processors, cause the one or more processors to:
    add the second motion vector difference to the first motion vector prediction value to obtain the first motion vector value; and
    add the second motion vector difference to the second motion vector prediction value to obtain the second motion vector value.

9. The video decoding terminal according to claim 7, wherein the instructions, when further executed by the one or more processors, cause the one or more processors to:
    obtain the second motion vector difference based on the first motion vector difference when a picture order count of each reference image of the current image block is greater than a picture order count of the current image block, or a picture order count of each reference image of the current image block is less than a picture order count of the current image block.

10. The video decoding terminal according to claim 7, wherein a number of pieces of candidate in the candidate predicted motion information list is obtained from at least one of the slice-layer header information, the image-layer header information, or the sequence-layer header information that are of the bitstream.

11. The video decoding terminal according to claim 7, wherein a number of pieces of candidate in the candidate predicted motion information list is less than a number of pieces in a motion information list in a merge mode.

12. The video decoding terminal according to claim 7, wherein the current image block is any prediction unit of a current to-be-reconstructed image block corresponding to the bitstream.

13. A non-transitory computer-readable medium having stored thereon instructions that, when executed by one or more processors, cause the one or more processors to perform operations of:
obtaining an index of predicted motion information of a current image block based on a bitstream, wherein a prediction mode of the current image block is a bidirectional prediction;
querying a candidate predicted motion information list based on the index to obtain candidate predicted motion information, wherein the candidate predicted motion information comprises motion information of an adjacent block of the current image block in a time domain or a space domain, wherein the candidate predicted motion information is used as the predicted motion information comprising reference image information, a first motion vector prediction value and a second motion vector prediction value, and wherein the reference image information comprises a reference image index of a first reference image and a reference image index of a second reference image;
obtaining a first motion vector difference of the current image block based on the bitstream;
obtaining a second motion vector difference based on the prediction mode and the first motion vector difference, wherein the second motion vector difference corresponding to the first motion vector prediction value and the second motion vector prediction value; and
obtaining a first motion vector value and a second motion vector value of the current image block based on the first motion vector prediction value, the second motion vector prediction value and the second motion vector difference, wherein the second motion vector difference is reused for the first motion vector prediction value and the second motion vector prediction value.

14. The non-transitory computer-readable medium according to claim 13, wherein the instructions, when executed by one or more processors, cause the one or more processors to perform operations including:
adding the second motion vector difference to the first motion vector prediction value to obtain the first motion vector value; and
adding the second motion vector difference to the second motion vector prediction value to obtain the second motion vector value.

15. The non-transitory computer-readable medium according to claim 13, wherein the instructions, when executed by one or more processors, cause the one or more processors to perform operations including:
obtaining the second motion vector difference based on the first motion vector difference when a picture order count of each reference image of the current image block is greater than a picture order count of the current image block, or a picture order count of each reference image of the current image block is less than a picture order count of the current image block.

16. The non-transitory computer-readable medium according to claim 13, wherein a number of pieces of candidate in the candidate predicted motion information list is obtained from at least one of the slice-layer header information, the image-layer header information, or the sequence-layer header information that are of the bitstream.

17. The non-transitory computer-readable medium according to claim 13, wherein a number of pieces of candidate in the candidate predicted motion information list is less than a number of pieces in a motion information list in a merge mode.

18. The non-transitory computer-readable medium according to claim 13, wherein the current image block is any prediction unit of a current to-be-reconstructed image block corresponding to the bitstream.

* * * * *